Figure 1:
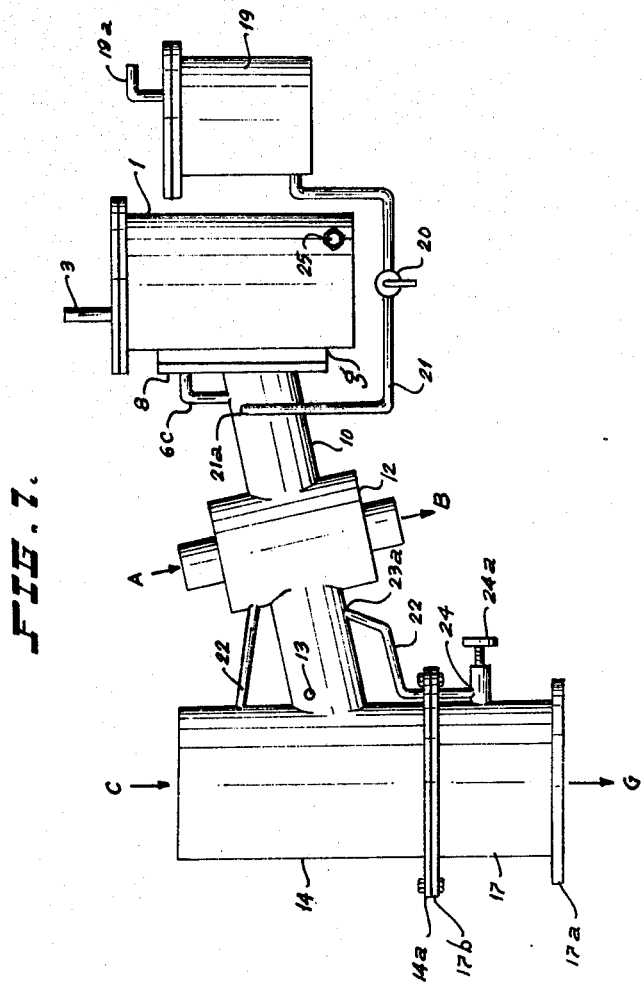

United States Patent [19]

Minoza

[11] 4,142,481
[45] Mar. 6, 1979

[54] VAPORIFIC CARBURETOR

[76] Inventor: Clemente Minoza, No. 3 Mahusay St., U.P. Village, Diliman, Quezon City, Philippines, 3004

[21] Appl. No.: 790,287

[22] Filed: Apr. 25, 1977

[30] Foreign Application Priority Data

May 10, 1976 [PH] Philippines ............... 18413

[51] Int. Cl.² .......................................... F02M 15/00
[52] U.S. Cl. ............................... 123/25 B; 123/25 R; 123/25 D; 123/25 P; 123/122 AA; 123/133; 48/180 C; 48/180 H; 261/18 A; 261/67; 261/145
[58] Field of Search ............. 48/180 C, 180 R, 180 H, 48/107, 180 A, 102 A; 261/67, 145, 18 A, DIG. 39, 41 A; 123/122 AA, 133, 25 R, 25 B, 25 D, 25 P, 25 F

[56] References Cited

U.S. PATENT DOCUMENTS

| | | | |
|---|---|---|---|
| 1,930,423 | 10/1933 | Eriksson | 261/DIG. 39 |
| 2,762,614 | 9/1956 | Schweiss | 48/180 C |
| 3,273,983 | 9/1966 | Minoza | 48/180 R |
| 3,915,669 | 10/1975 | Minoza | 48/180 C |
| 3,935,290 | 1/1976 | Dickensheets et al. | 261/44 R |

OTHER PUBLICATIONS

Product Engineering Bulletin, DuPont, pp. 1 and 2, 1955.

*Primary Examiner*—S. Leon Bashore
*Assistant Examiner*—Peter F. Kratz
*Attorney, Agent, or Firm*—Silverman, Cass & Singer

[57] ABSTRACT

This invention relates to a vaporific carburetor for a gasoline engine, consisting of an evaporator tube assembly inclined to the horizon, an auxiliary fuel tank assembly at the upper end of the evaporator tube assembly, a mixer tube assembly at the lower portion of the evaporator tube assembly and an auxiliary water tank connected by a small water pipe to the upper portion of the evaporator tube assembly.

The vaporific carburetor differs from the vaporizer carburetor in four different aspects. The first difference is in the cut at the outlet of the high speed tube, and the position of the cut with respect to the venturi. In the vaporizer carburetor the said cut is perpendicular to the wall of the venturi while in the vaporific carburetor the said cut is parallel with the wall of the venturi. The second difference is in the connection of the inlet of the idling speed tube. In the vaporizer carburetor the inlet of the idling speed tube is connected to the evaporator tube at a point below the air holes of the evaporator tube. In the vaporific carburetor the joint of the inlet of the idling speed tube to the evaporator tube is above the air holes of the evaporator tube. The third difference is in the position of the discharging portions of the two siphon tubes. In the vaporizer carburetor the discharging ends of both siphon tubes are inside the evaporator tube. In the vaporific carburetor the discharing end of the idling speed siphon tube is inside the evaporator tube while the discharging end of the high speed siphon tube is outside the evaporator tube. The fourth difference is that the inlet of the idling speed siphon tube in the vaporizer carburetor is made of pure metal while in the vaporific carburetor the inlet of the idling speed siphon tube is lined with plastic or leather.

11 Claims, 7 Drawing Figures

VAPORIFIC CARBURETOR

This invention relates to carburetor in general and more particularly to a vaporific carburetor.

The present invention is an improvement of my vaporizer carburetor which was granted U.S. Pat. No. 3,915,669 on Oct. 28, 1975. The specification and claims of my former vaporizer carburetor are made part hereof.

The vaporific carburetor differs from the vaporizer carburetor under U.S. Pat. No. 3,915,669 in four different aspects where in lie the patentable improvements of my present invention over my former vaporizer carburetor and which will be descrided in the light of the accompanying drawings.

The first difference lies in the cut at the free end (outlet of the high speed tube) of the first conduit means which is inside the venturi in the baffle plate of the mixer tube. In the vaporizer carburetor the cut is perpendicular to the longitudinal axis of the tube and the free end is set such that the cut is perpendicular to the wall of the venturi and to the direction of the flow of the air through the venturi when the engine is in operation. In this case the air flowing through the venturi flows around the outside of the end of the high speed tube not over the opening or cut of the said tube, hence there is less vacuum inside the high speed tube and inside the evaporator tube, therefore there is less evaporation of the fuel and water in the said tube.

In the vaporific carburetor the cut at the free end (outlet of the high speed tube) of the first conduit means makes an acute angle with the longitudinal axis of the said tube. The free end of the said tube is disposed inside the venturi such that the said cut is more or less parallel with the wall of the venturi and parallel with the direction of the flow of the air when the engine is in operation. The high velocity air flows over the cut or opening of the high speed tube. The pressure at the cut or opening of the said tube is low when the engine is in operation, by Bernoulli's theorem which states that "where the velocity of the fluid is high the pressure is low." It follows that when the engine is in operation, there is a high vacuum inside the high speed tube and in the vaporator tube so that the degree of the vaporization of the fuel and the water in the said tube is high. There is a clearance between the cut of the high speed tube and the wall of the venturi and said clearance has a critical value of about one eight ($\frac{1}{8}$) of an inch more or less.

The second difference lies in the place of connection of the upper end (inlet) of the idling speed tube (the second conduit means) to the evaporator tube. The main purpose of this idling speed tube is to suck fuel in the evaporator when the engine is idling. In the vaporizer carburetor, the upper end (the inlet) of the idling speed tube is connected to the evaporator tube at a joint below the primary air holes of the evaporator tube. Air from outside the evaporator tube flows downward through these air holes when the engine is in operation. When the throttle valve is closed when the engine is idling, there is suction effect in the idling speed tube. The idling speed tube will suck air from outside flowing through the said holes, instead of fuel, because the inlet of the idling speed tube is below the said air holes.

With the vaporizer carburetor the engine exhaust gases were analyzed while the engine was idling. The exhaust gases analysis showed about 0.2 percent of carbon monoxide but there was excess nitrogen or air. For a six cylinder engine the vaporizer carburetor has six high speed tubes. The engine being in operation, the throttle valve wide opened then instantly close, the engine will stop. The excess air in the exhaust gases and stopping of the engine when the throttle valve is closed instantly are due to the position of the inlet of the idling speed tube - that position is below the primary air holes of the evaporator tube.

In the vaporific carburetor the upper end (the inlet) of the idling speed tube (the second conduit means) is connected to the interior of the evaporator tube at a joint above the primary air holes of the evaporator tube, but below the joint of the high speed tube to the evaporator tube, that is the inlet of the idling speed tube is at a point midway between the primary air holes and the joint of the high speed tube to the evaporator tube. The said point is critical. In this case the idling speed tube will suck fuel in the evaporator tube when the throttle valve is closed during engine idling speed. With this position of the inlet of the idling speed tube the exhaust gases of the engine while idling have no more excess air and the carbon monoxide (CO) content of the exhaust gases is about 0.15 percent. With the vaporific carburetor with six high speed tube, the engine will not stop when the throttle valve is closed instantly from a wide opened position.

The third difference lies in the position of the discharging end of the high speed siphon tube. In the vaporizer carburetor, the discharging end of the high speed siphon tube and the discharging end of the idling speed siphon tube are both inside the metal rod core which is inside the evaporator tube, the two ends are near each other. The fuel level in the fuel tank is kept constantly above the upper bend of the idling speed siphon tube, so that the said fuel level is very near the level of the discharging end of the high speed siphon tube. When the engine is idling there is a tendency that the fuel will flow through the high speed siphon tube because the air flowing through the primary air holes out of the evaporator tube and air flowing through the idling speed tube will create a partial vacuum in the evaporator tube.

In the vaporific carburetor the discharging end of the idling speed siphon tube is inside the metal rod core which is inside the evaporator tube while the discharging end of the high speed siphon tube is inside a hole in the upper portion of the flange of the evaporator tube. The said end of the high speed siphon tube is outside the evaporator tube, far from the fuel level in the fuel tank so that no fuel will flow through the high speed siphon tube when the engine is running at idling speed. The said hole in the flange of the evaporator tube is connected by a tube to the inside of the evaporator tube so that fuel passing through the high speed siphon tube flows into the evaporator tube.

The fourth difference lies in the construction of the mouth or inlet of the idling speed siphon tube. In the vaporizer carburetor the mouth of the idling speed siphon tube, circular in cross-section, is pure metal. The metallic needle valve sets on the metallic mouth of the idling speed siphon tube. The needle valve seat is not watertight, so that fuel in the fuel tank will flow through the said mouth into the evaporator tube even if the needle valve is closed. The needle valve is closed, the engine is stopped for eight hours, the fuel level in the fuel tank will be below the upper bend of the idling speed siphon tube so that the engine will not start to operate at once.

In the vaporific carburetor the metallic mouth or inlet of the idling speed siphon tube circular in cross-section, is provided with a liner made of flexible material like plastic or leather so that the metal needle valve sets on the flexible material thus insuring its tightness. With this liner, the needle valve being closed and the engine is stopped for 8 days, the fuel level in the fuel tank will remain above the upper bend of the idling speed siphon tube.

The object of my present invention, the vaporfic carburetor is to improve my former vaporizer carburetor so that with the vaporific carburetor the engine will have greater fuel saving, better pick up and less carbon monoxide in the exhaust gases of the engine, than those when the engine is using the vaporizer carburetor.

The present invention, vaporific carburetor for use of a gasoline engine, consists mainly of an auxiliary fuel reservoir or tank assembly attached to the upper end of an inclined evaporator tube assembly and a mixer tube assembly disposed at the lower portion of the evaporator tube assembly. The evaporator tube assembly which is heated by the engine exhaust gases, is adapted to continously vaporize fuel flowing through two siphon tubes from the auxiliary fuel reservoir or tank and water from an auxiliary water tank. The fuel vapor and water vapor flows into a mixer tube assembly which can be connected to the inlet manifold of the engine by means of an adapter tube assembly. The fuel and water vapor mixes with air in the mixer tube assembly and the resulting mixture of fuel vapor, water vapor and air flows into the cylinder of the engine, passing by the throttle valve inside the adapter tube assembly. Near the end of the compression stroke of the engine piston the water vapor becomes steam due to the heat of compression. At the end of the compression stroke, the fuel vapor will explode and impart power to the piston of the engine. The steam will absorb some of the heat of combustion of the fuel, the steam will instantaneously expand and add power to the piston of the engine. In this case the engine may be called gasoline steam engine.

The principle of operation of the vaporific carburetor is as folows: The fuel reservoir or tank being supplied with fuel from the fuel pump of the engine, is connected to the upper end of the inclined evaporator tube. In the said tank are two siphon tubes namely the idling speed siphon tube and the high speed siphon tube. The entry ends of these siphon tubes are each provided with a needle valve. The needle valve for the idling speed siphon tube is closed when the engine is stopped and opened when the engine is in operation. The needle valve for the high speed siphon tube is always opened. The fuel level in the tank, which is maintained constant by a float valve, is above the entry ends of both siphon tubes and above the upper bend of the idling speed siphon tube, but below the discharging end of the high speed siphon tube so that no fuel will flow through high speed siphon tube when the engine is idling or stopped. The discharging end of the idling speed siphon tube is inside the rod core which is inside the evaporator tube, while that of the high speed siphon tube is inside a hole in the upper portion of the flange of the evaporator tube. The said hole is connected by a tube to the inside of the evaporator tube. The lower portion of the evaporator tube is inside the upright mixer tube which can be connected to the engine by means of the adapter tube. At the middle portion of the evaporator tube is a heat exchanger where part of the hot exhaust gases of the engine pass through so that the evaporator tube is hot when the engine is in operation. The high speed tube connects from the inside of the evaporator tube at its middle portion to the venturi in the baffle plate in the mixer tube. At the lower portion of the evaporator tube are primary air holes. The idling speed tube connects from the inside of the adapter tube to the inside of the evaporator tube at a joint above the primary air holes.

An auxiliary water tank supplied with water by means of a water pump from a main water tank, is connected by means of a tube to the upper portion of the evaporator tube. By means of a float valve the water level in the auxiliary water tank is kept constantly below the water inlet in the evaporator tube so that no water will flow into the evaporator tube when the engine is idling or stopped.

The needle valve for the idling speed siphon tube is opened, fuel flows into the evaporator tube. The switch of the engine being turned on, the engine is cranked, the engine starts to run. When the engine is idling, fuel flows through the idling speed siphon tube. Part of the fuel flows out of the evaporator tube where it will be vaporized by the air flowing through the primary air holes. And the other part of the fuel flows through the idling speed tube where it will vaporize since inside the said tube is at low pressure. The fuel vapor mixes with the air flowing into the mixer tube. The mixture of fuel vapor and air flows into the cylinder of the engine passing by the throttle valve in the adapter tube. When the said throttle valve is opened wide, air at high velocity flows through the venturi, high vacuum is created inside the evaporator tube. Water from the auxiliary water tank and additional fuel from the high speed siphon tube flow into the evaporator tube. The evaporator tube being hot and under low pressure, the fuel and water, vaporize. The fuel and water vapor flows through the high speed tube into the mixer tube, where the said vapor mixes with the air in the mixer tube. The mixture of fuel and water vapor, and air flows into the cylinder of the engine. The fuel vapor will explode and impart power to the engine piston. The water vapor being changed to steam will expand instantaneously and will give additional power to the engine piston.

In the accompanying drawings FIG. 1 is the elevation of the whole vaporific carburetor assembly showing the relative locations of the different parts and indicating their positions relative to the induction flow C–G and the engine exhaust gases flow A–B. FIG. 1 also shows the auxiliary water tank 19 being connected by means of a water pipe 21 to the evaporator tube 10, at joint 21a. The water valve 20 regulates the flow of water into the evaporator tube 10. The water tank 19 is connected to a water pump at 19a.

Figure 2:
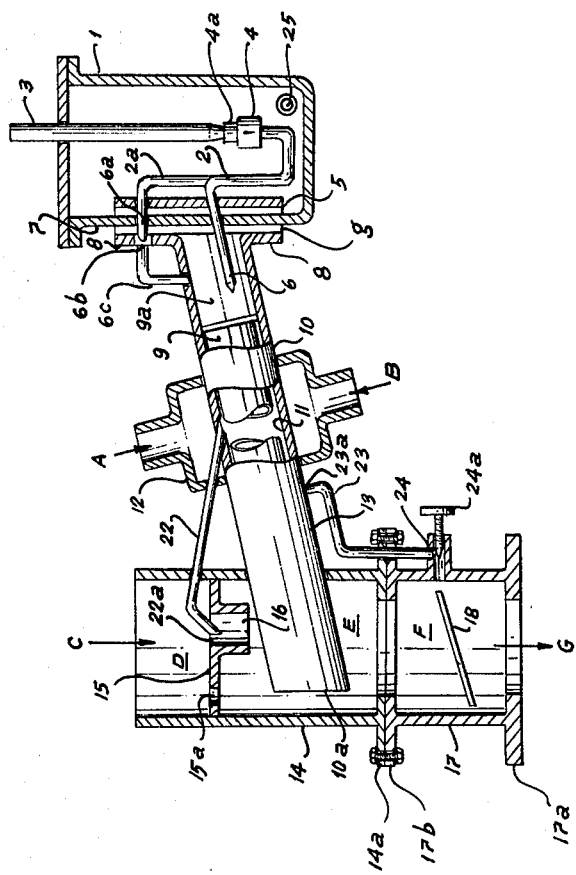

FIG. 2 is the sectional view of FIG. 1, showing the details of the different parts, the relative positions of idling speed siphon tube 2 and high speed siphon tube 2a, and the position of the cut 22a inside the venturi 16 and the plastic liner 4a at the inlet or mouth 4 of the idling speed tube 2. The said sectional view is in an imaginary plane passing through the longitudinal axis of the evaporator tube and the vertical axis of the upright mixer tube. The auxiliary water tank 19 shown in FIG. 1, is not shown in FIG. 2, since it is not in the said imaginary plane.

Figure 3:
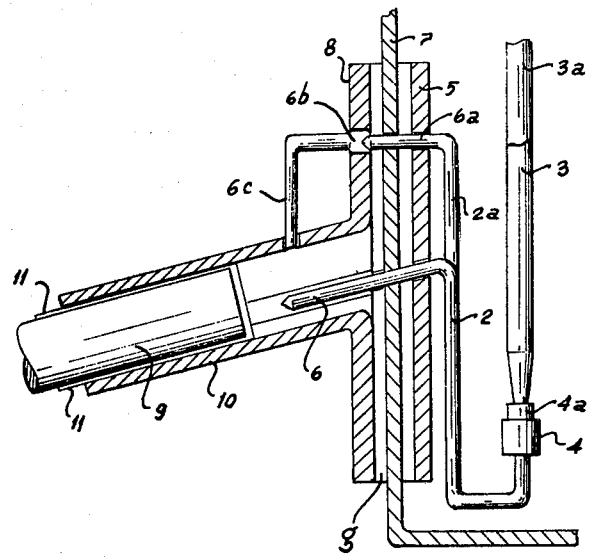

FIG. 3 is a broken sectional view of the upper portion of the evaporator tube 10, showing the relative positions of the evaporator tube flange 8, the fuel tank flange 7 and the siphon tube flange 5 with gasket g, the hole 6b in the evaporator tube flange 8, the tube 6c and the relative positions of the siphon tubes inside the auxiliary fuel tank 1.

Figure 4:
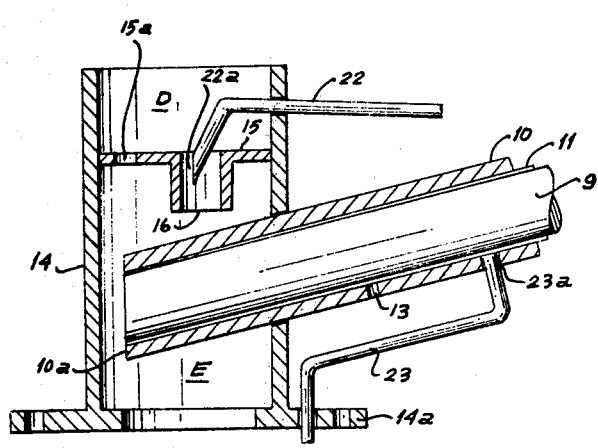
Figure 4A:
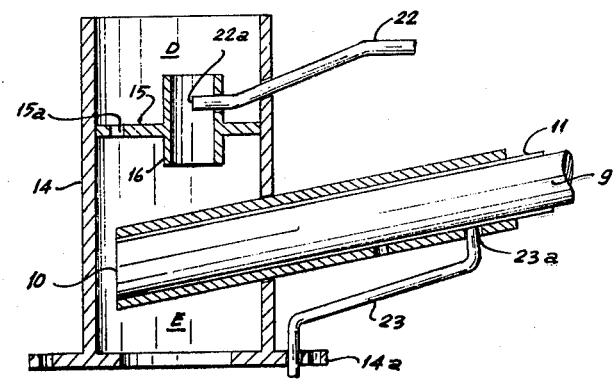

FIG. 4 is a sectional view of the upright mixer tube 14, showing the relative position of the lower portion of the evaporator tube with respect to the mixer tube. FIG. 4 also shows the position of the cut 22a at the end of high speed 22, said cut being parallel with the wall of the venturi 16 and the connection of the inlet of idling speed tube 23 to the evaporator tube 10 at the joint 23a which is above the primary air holes 13. FIG. 4a is a sectional view of the upright mixer tube 14, showing another position of cut 22a.

Figure 5:
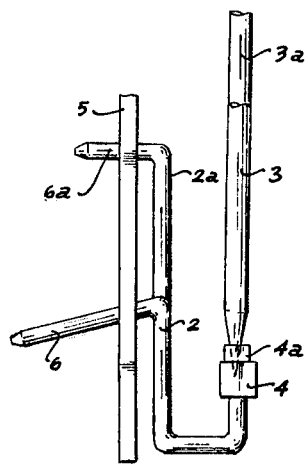

FIG. 5 is the side view of the flange of the two siphon tubes, showing the relative positions of the idling speed siphon tube 2 and the high speed siphon tube 2a and the plastic liner 4a inside the mouth 4.

Figure 6:
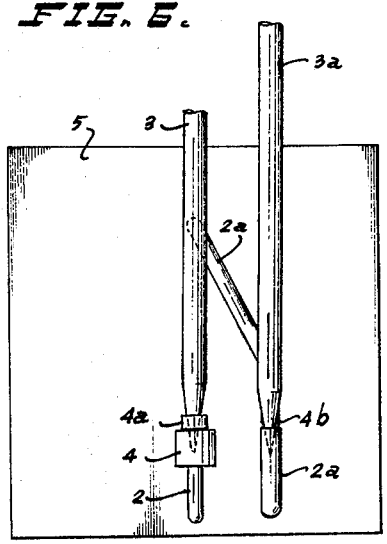

FIG. 6 is the back view of the siphon tube flange 5, showing the relative position of the inlet portions of the siphon tubes, each inlet being provided with a needle valve marked 3 and 3a, and the plastic liner 4a inside the mouth 4.

In the preferred form of the invention as shown in the drawings, the evaporator tube flange 8, the fuel tank flange 7 and the siphon tube flange 5 are bolted together, the fuel tank flange 7 being at the middle with gasket g between the joints, such that the entry end of siphon tube 2 and the entry end of siphon tube 2a are inside the fuel tank 1. The discharging portion 6 of the idling speed siphon tube 2 is inside the metal rod core which is inside the evaporator tube, while the discharging end 6a of high speed siphon tube 2a is inside the hole 6b in the flange of the evaporator tube. The discharging portions of both siphon tubes pass through the flange of the fuel tank. The fuel tank 1 which looks like a metal box is provided with a cover. A gas tube 25 passes through the fuel tank. When heavy fuel like diesel fuel is used, part of the exhaust gases of the engine is allowed to pass through this gas tube 25 so that the said heavy fuel will be pre-heated. The lower portion of the evaporator tube 10 is disposed inside the upright mixer tube 14 such that the evaporator tube is inclined horizontally and the cut 10a is parallel with the wall of the mixer tube. The lower portion of the mixer tube is provided with a flange 14a which is connected to the upper flange 17b of the adapter tube. The lower flange 17a of the adapter tube 17 is matched with the flange of inlet manifold of the engine. All the joints in this carburetor are airtight or watertight.

The Idling Speed Siphon Tube and the High Speed Siphon Tube

The idling speed siphon tube 2 and the high speed siphon tube 2a are metal tubes with small inside diameter opened at both ends and bent in the form as shown in the drawings. The discharging ends (the outlet) of both siphon tubes are tapered as shown in the drawings, so that the outlets are smaller than the inlets (the entry ends) of both siphon tubes. The discharging portion of both siphon tubes pierce through the siphon flange 5, such that the discharging end 6a of the high speed siphon tube 2a is above the discharging end 6 of the idling speed siphon tube 2. Both siphon tubes and flange 5 are integral. The inlet or mouth 4 of the idling speed siphon tube 2 is provided with a liner 4a made of flexible material like plastic or leather where the needle valve 3 sets on the ensure its tightness. The outside surface of the liner is glued to the mouth 4, with epoxy or any other kind of glue, so that the joint thereat is water tight or gasoline-tight. The mouth 4b of the high speed siphon tube 2a is pure metal.

The Needle Valves

Each inlet of the two siphon tubes has a metal needle valve. The end of each valve closing the inlet of each siphon tube is sharpened like a pencil so that the valve looks like a big needle. The upper ends of the needle valves pass through the cover of the auxiliary fuel reservoir or tank 1.

The upper end of the needle valve 3 for the idling speed siphon tube 2 is connected by means of a lever and cable (choke cable) to the dashboard of the automobile or car, so that the said valve can be opened or closed while the car is running. While the car is stopped but the engine is in operation, the opening or lift of valve 3 can be adjusted so that the engine will have slow smooth idling speed. The valve 3 which is opened when the engine is in operation and closed when the engine is stopped sets on the plastic liner 4a. When valve 3 is opened fuel will flow through the idling speed siphon tube since the fuel level in the fuel tank is above the upper bend of said siphon tube.

The needle valve 3a controlling the flow of fuel passing through the high speed siphon tube 2a, entering through mouth 4b, is always opened. The opening of said valve can be adjusted so that the engine will have good pick up and can attain its rated maximum power. The end of said valve above the cover of the fuel tank is provided with screw and nut, so that turning the screw clockwise will decrease the opening of the said valve and turning the said screw counter clockwise will increase the opening of the said valve. The upper bend of the high speed siphon tube is always above the fuel level in the fuel tank 1 so that no fuel will flow through the said siphon tube when the engine is idling or is stopped even though the needle valve 3a is always opened. At high engine speed due to the low pressure at the cut 22a of the high speed tube, a high vacuum is created in the evaporator tube so that additional fuel will flow through the high speed siphon tube into the evaporator tube.

The Evaporator Tube

The evaporator tube 10 opened at both ends is a metal tube of uniform inside diameter throughout its length. The evaporator tube having a flange 8, at its upper end is in communication with the fuel tank 1. At the upper portion of the flange 8 is a hole 6b where the discharging end 6a of the high speed siphon tube 2a fits. The hole 6b is connected by a small tube 6c to the interior of the evaporator tube, so that fuel flowing through the high speed siphon tube 2a will flow into the said evaporator tube. The lower end of the evaporator tube is disposed inside the upright mixer tube 14, in such a way that the evaporator tube is inclined horizontally and the cut 10a is parallel with the wall of the mixer tube. The evaporator tube is fixed to the mixer tube so that the two tubes are integral. At the lower portion of the evaporator tube but outside the mixer tube are primary air holes 13 in communication with the interior of the evaporator tube and disposed around the circumference of the said tube. The upper end (the inlet) of the idling speed tube 23 is connected to the interior of the evaporator tube at a joint 23a above the air holes 13. The joint 23a is farther from the lower end of the evaporator tube than the primary air holes 13. At the middle portion of the evaporator tube is the heat exchanger 12 where part of the hot exhaust gases of the engine will flow through in the direction A-B when the engine is in operation. A metal rod core wrapped laterally around with thin metal sheet 11, is disposed inside the evaporator tube 10 throughout the length of the said tube. The metal rod core is divided into two portions, the lower portion 9 and the upper 9a which has one axial hole where the discharging end 6 of the idling speed siphon tube 2 is disposed as shown in FIGS. 2 and 3. At the upper portion of the thin metal sheet 11, there is a small clearance between the outside surface of said metal sheet and the inside surface of the evaporator tube, and there are small holes where the fuel from the idling speed siphon tube will pass through into the said clearance.

The Mixer Tube

The mixer tube 14 is a metal tube of uniform inside diameter throughout its length. The lower end of the mixer tube being provided with a flange 14a is connected to the upper flange 17b of the adapter tube 17. The lower flange 17a of the adapter tube can be attached to the flange of the inlet manifold of the engine so that the mixer tube and the adapter tube are kept upright. The mixer tube is provided with a baffle plate 15 which is a circular metal plate fixed to the inside of the mixer tube, such that the plane of plate 15 is perpendicular to the vertical axis of the mixer tube. The baffle plate being provided with venturi 16 and supplementary air holes 15a divides the mixer tube into two compartments namely, the upper compartment D and the lower compartment E. Compartment D contains fresh air from outside the mixer tube, while compartment E contains the lower portion of the evaporator tube and a mixture of fuel vapor, water vapor and air when the engine is in operation. The upper end (inlet) of high speed tube 22 is connected to the interior of the evaporator tube at its middle portion while the lower end (outlet) with cut 22a is inside the venturi 16 such that the cut 22a is more or less parallel with the wall of the venturi 16.

The flange 14a at the lower end of the mixer tube 14 should be connected by a metal plate or rod to the outside surface of the exhaust manifold of the engine so that when the engine is in operation the lower portion of the mixer tube is hot. It is necessary that the lower portion of the mixer tube should be hot in order that the fuel from the high speed tube will be completely vaporized.

One of the supplementary air holes 15a in the baffle plate 15, should be provided with a valve called air valve which can control the opening of this particular hole. This air valve is for fine adjustment of the air fuel ratio. When this air valve is closed a little, the air flowing through the venturi is increased a little so that the suction effect of the high speed tube is increased, hence there is an increase in the gasoline or fuel vapor flowing into the mixer tube. When this air valve is opened little there is a decrease in the fuel vapor flowing into the mixer tube, through the high speed tube. The opening of this air valve should ve adjusted while the engine is in operation, but the car is at standstill.

The Adapter Tube

The adapter tube 17 is a tube with uniform inside diameter. The upper and lower ends of said tube are each provided with a flange. The upper flange 17b matches with the flange 14a of the mixer tube, while the lower flange 17a can be attached to the flange of the inlet manifold of the engine so that the mixer tube and the adapter tube are kept upright. Inside the adapter tube is a throttle valve 18 which regulates the flow of combustible mixture into the cylinder of the engine when the engine is in operation. The throttle valve which is an elliptical plate is set inside the adapter tube such that the plane of said plate is inclined with the vertical axis of the adapter tube when the engine is idling or stopped as shown in FIG. 2. In this position the throttle valve 18 divides the adapter tube into two sections, namely the upper section section F and the lower section G. The throttle valve can be opened or closed by the operator of the engine.

The High Speed Tube

The high speed tube 22 (the first conduit means) is a metal tube with small inside diameter. The upper end (the inlet) of the said tube is connected with an air tight joint to the inside and at the middle portion of the evaporator tube 10. The lower end (the outlet) of the said tube is provided with a cut 22a which makes an acute angle with the longitudinal axis of the tube. The said cut is set inside the venturi 16 such that the said cut is more or less parallel with the wall of the venturi. There is a clearance between the wall of the venturi and the said cut. Such clearance has a critical value of about ⅛ of an inch more or less. At high engine speed, air at high velocity, flows through the venturi passing over the said cut, so that there will be low pressure at the said cut, hence there will be a high vacuum in the high speed tube 22 and inside the evaporator tube 10. The fuel and water will be vaporized since the interior of the evaporator tube is hot and at low pressure. The fuel and water vapor flows through the high speed tube into the mixer tube where the said vapor mixes with the air.

There is another way of placing the lower end (outlet) of the high speed tube 22, as shown in FIG. 4a, the cut 22a is perpendicular to the longitudinal axis of the lower portion of tube 22. The venturi 16 extends above the baffle plate 15, near the middle of the length of the venturi and at the side of the venturi is a hole. The lower portion of the high speed tube 22, passes through the said hole such that the cut 22a is parallel with the wall of the venturi 16 and parallel with the direction of the flow of the air passing through the venturi when the engine is in operation. There is a clearance between the wall of the venturi 16 and the cut 22a. The said clearance has a critical value of about one eight of an inch more or less. At high engine speed, the high velocity air flowing through the venturi flows over the cut 22a, so that there is low pressure at the end of tube 22, thus there will be suction effect in the evaporator tube 10. There may be other methods or ways of placing the lower end of tube 22 inside the venturi but the objectives are the same that is to make the high speed air passing through the venturi flow over the opened end of high speed tube 22.

The Idling Speed Tube

The idling speed tube 23 (the second conduit means) is a metal tube with small inside diameter. The upper end (the inlet) of said tube is connected with an airtight joint to the inside of the evaporator tube at the joint 23a above the primary air holes 13 as shown in FIGS. 2 and 4. The lower end (outlet) or the idling speed tube is connected to the inside of the adapter tube 17 at the air tight 24 thereat shown in FIG. 2. When the throttle valve 18 is set for idling engine speed, as shown in FIG. 2, there is suction effect in the idling speed tube so that some of the fuel in the evaporator will flow through the idling speed tube. Since the idling speed tube is at low pressure the fuel will be vaporized as it flows through the idling speed tube. Near the airtight joint 24 is a screw down valve 24a to modify or regulate the flow of fuel vapor through the idling speed tube 23 into the adapter tube 17 and into the cylinder of the engine. This screw down valve is a screw with one end sharpened like a pencil. The said end fits in a hole where the fuel vapor passes through. The screw valve which may be called "idling screw" is for fine adjustment of the idling speed of the engine.

Detailed Operation

The detailed operation of the vaporific carburetor is as follows, explained in the light of FIGS. 1 and 2. The vaporific carburetor is installed in a gasoline engine of a car or automobile. The lower flange of the adapter tube 17 is attached to the flange of the inlet manifold of the engine such that the imaginary plane passing through the longitudinal axis of the evaporator tube and the mixer tube 14 will be either perpendicular to or parallel with the direction of motion of the car. The fuel reservoir or tank 1 is connected to the fuel pump of the engine by means of pipe and flexible hose, and is filled with gasoline the level of which should be above the upper bend of the idling speed siphon tube but below the discharging end 6a of the high speed siphon tube 2a. The auxiliary water tank 19 shown in FIG. 1 is connected to the water pump and is filled with water the level of which is below the water inlet 21a. The heat exchanger 12 is connected to exhaust manifold of the engine, the needle valve 3 is connected by means of lever and choke cable to the dashboard of the car so that the said valve could be opened and closed by the driver of the car and the throttle valve spindle is connected to the accelarator of the car. The ignition switch of the engine is turned on, the needle valve 3 is opened and the engine is cranked so that the engine will start to run. The openings of needle valve 3 of the throttle valve 18 and of the idling screw 24a are adjusted so that the engine will have slow smooth idling speed. The car is now ready to run. The openings of the needle valve 3a and of the water valve 20 are adjusted so that the engine will have good pick up and can attain its rated maximum power.

It is believed that the advantages of the invention, the vaporific carburetor over the vaporizer carburetor have been fully explained in connection with the above specification and drawings and those skilled in this art will understand the manner of construction of the vaporific carburetor, operations and use thereof. It is desired to point out that considerable variations in many of the details may be made without in any departing from the spirit and scope of the invention as defined in the appended claims.

What I claim is:

1. In a carburetor for an engine, the carburetor having a fuel feeder assembly, a water supply assembly, a mixer tube assembly, an evaporator tube assembly, means for feeding metered quantities of liquid fuel and water to said mixer tube assembly by way of said evaporator tube assembly, said mixer tube assembly being in communicating coupled relationship to the inlet manifold of the engine, the evaporator tube assembly being horizontally inclined and having upper and lower ends defining an inlet and an outlet respectively, means securing the inlet end of said evaporator tube to said fuel feed assembly and means securing the outlet end of said evaporator tube to said mixer assembly, the inlet being coupled communicatively with said fuel feeder assembly for delivery of liquid fuel thereto and said outlet being coupled communicatively with the interior of the mixer tube assembly for delivering a liquid fuel and water-vapor mixture thereto, the fuel feeder assembly comprising an auxiliary fuel tank for holding a predetermined volume of liquid fuel, a pair of siphon tubes, said siphon tubes each having an entry end interior of said fuel feeder assembly, needle valve means at each entry end to control flow therethrough, and outlet ends each communicating to said inlet of the evaporator tube, a heat exchanger assembly having means for receiving the exhaust gases from the engine, and surrounding said evaporator tube assembly at a location between the inlet and outlet thereof, first conduit means leading from the interior of the evaporator tube assembly at the location therealong which is surrounded by the heat exchanger assembly to the interior of the mixer tube assembly, an adapter tube connected to the lower end of said mixer tube for coupling said mixer tube assembly to the inlet manifold of the engine, said adapter tube containing a throttle valve, air inlet means formed in said evaporator tube assembly exterior of said mixer tube assembly and located in the vicinity of the outlet of said evaporator tube assembly for introducing air into said area thereof during operation of the engine and second conduit means upstream of said air inlet means and downstream of said first conduit means and leading from the interior of the evaporator tube assembly to the interior of the adapter tube, the mixer tube assembly having upper and lower chambers, said upper chamber including an air inlet, plate means separating said chambers and including wall means defining a venturi passage between said chambers, said first conduit means having its outlet interior of said venturi passage, said last outlet terminating in a cross-cut opening disposed in a plane substantially parallel to the direction of flow of air through said venturi passage and having a clearance of about one-eighth inch from said wall means, the quantity of fuel and water vapor passing through said first conduit means to said mixer tube being dependent upon the velocity of air flow through said venturi passage when the engine is in operation.

2. The carburetor as claimed in claim 1 and said second conduit means communicating to the evaporator tube at a location midway between the portion thereof surrounded by said heat exchanger assembly and said air inlet means.

3. The carburetor as claimed in claim 1 wherein said pair of siphon tubes each have a tapered outlet end, one of said outlet ends terminating directly interior of the evaporator tube near the inlet thereof, the inlet end of said evaporator tube having a circumferential flange, means defining a passage through said flange, and a conduit located exterior of said evaporator tube and leading sealingly from said passage to the interior of said evaporator tube in the vicinity of the inlet thereof, the other of said outlet ends terminating in said last mentioned passage, the siphon tube having said other outlet end being operable only when the engine is operating at other than idle speed, both siphon tubes being operable by differential pressure gradient within the evaporator tube assembly.

4. The carburetor as claimed in claim 3 and a flexible liner seated at the entry end of the siphon tube with said outlet end terminating directly interior of the evaporator tube and the needle valve thereof being seated thereon to effect a sealed coupling therewith.

5. The carburetor as claimed in claim 2 wherein said pair of siphon tubes each have a tapered outlet end, one of said outlet ends terminating directly interior of the evaporator tube near the inlet thereof, the inlet end of said evaporator tube having a circumferential flange, means defining a passage through said flange, and a conduit located exterior of said evaporator tube and leading sealingly from said passage to the interior of said evaporator tube in the vicinity of the inlet thereof, the other of said outlet ends terminating in said last mentioned passage, the siphon tube having said other outlet end being operable only when the engine is operating at other than idle speed, both siphon tubes being operable by differential pressure gradient within the evaporator tube assembly.

6. The carburetor as claimed in claim 5 and a flexible liner seated at the entry end of the siphon tube with said outlet end terminating directly interior of the evaporator tube and the needle valve thereof being seated thereon to effect a sealed coupling therewith.

7. The carburetor as claimed in claim 4 in which said liner is a tube seated in the said entry end and having an end portion protruding therefrom, the needle valve being seated in said end portion.

8. In a carburetor for an engine, the carburetor having a fuel feeder assembly, a water supply assembly, a chambered mixer tube assembly including an air inlet, means defining a venturi passage between chambers of said mixer tube assembly downstream of said air inlet, an evaporator tube assembly, means for feeding metered quantities of liquid fuel and water to said mixer tube assembly by way of said evaporator tube assembly, said mixer tube assembly being in communicating coupled relationship to the inlet manifold of the engine, the evaporator tube assembly being horizontally inclined and having upper and lower ends defining an inlet and an outlet respectively, means securing the inlet end of said evaporator tube to said fuel feed assembly and means securing said evaporator tube to said mixer assembly, with the outlet end thereof disposed interior of said mixer assembly, the inlet being coupled communicatively with said fuel feeder assembly for delivery of liquid fuel thereto and said outlet being coupled communicatively with the interior of the mixer tube assembly below the venturi passage for delivering a liquid fuel and water-vapor mixture to the mixer tube, the fuel feeder assembly comprising an auxiliary fuel tank for holding a predetermined volume of liquid fuel, a pair of siphon tubes, said siphon tubes each having an entry end interior of said fuel feeder assembly, needle valve means at each entry end to control flow therethrough, and outlet ends each communicating to said inlet of the evaporator tube, a heat exchanger assembly having means for receiving the exhaust gases from the engine, and surrounding said evaporator tube assembly at a location between the inlet and outlet thereof, first conduit means leading from the interior of the evaporator tube assembly at the location therealong which is surrounded by the heat exchanger assembly to the interior of the mixer tube assembly to a location within the venturi passage, an adapter tube coupled to said mixer tube assembly downstream of said venturi passage and coupled to the inlet manifold of the engine, a throttle valve within said adapter tube, air inlet means formed in said evaporator tube assembly located exterior of the mixer tube assembly and in the vicinity of the outlet of said evaporator tube for introducing air into said area thereof during operation of the engine and second conduit means leading from the interior of the evaporator tube assembly to the interior of the adapter tube, and said second conduit means communicating to the evaporator tube at a location midway between the portion thereof surrounded by said heat exchanger assembly and said air inlet means.

9. The carburetor as claimed in claim 8 wherein said pair of siphon tubes each have a tapered outlet end, one of said outlet ends terminating directly interior of the evaporator tube near the inlet thereof, the inlet end of said evaporator tube having a circumferential flange, means defining a passage through said flange, and a conduit located exterior of said evaporator tube and leading sealingly from said passage to the interior of said evaporator tube in the vicinity of the inlet thereof, the other of said outlet ends terminating in said last mentioned passage, the siphon tube having said other outlet end being operable only when the engine is operating at other than idle speed, both siphon tubes being operable by differential pressure gradient within the evaporator tube assembly.

10. The carburetor as claimed in claim 9 and a flexible liner seated at the entry end of the siphon tube with said outlet end terminating directly interior of the evaporator tube and the needle valve thereof being seated thereon to effect a sealed coupling therewith.

11. The carburetor as claimed in claim 10 in which said liner is a tube seated in the said entry end and having an end portion protruding therefrom, the needle valve being seated in said end portion.

* * * * *